April 21, 1964     P. REGNAULD     3,130,294
METHOD FOR PRE-HEATING A JOINT TO BE ARC-WELDED
Filed Nov. 25, 1960
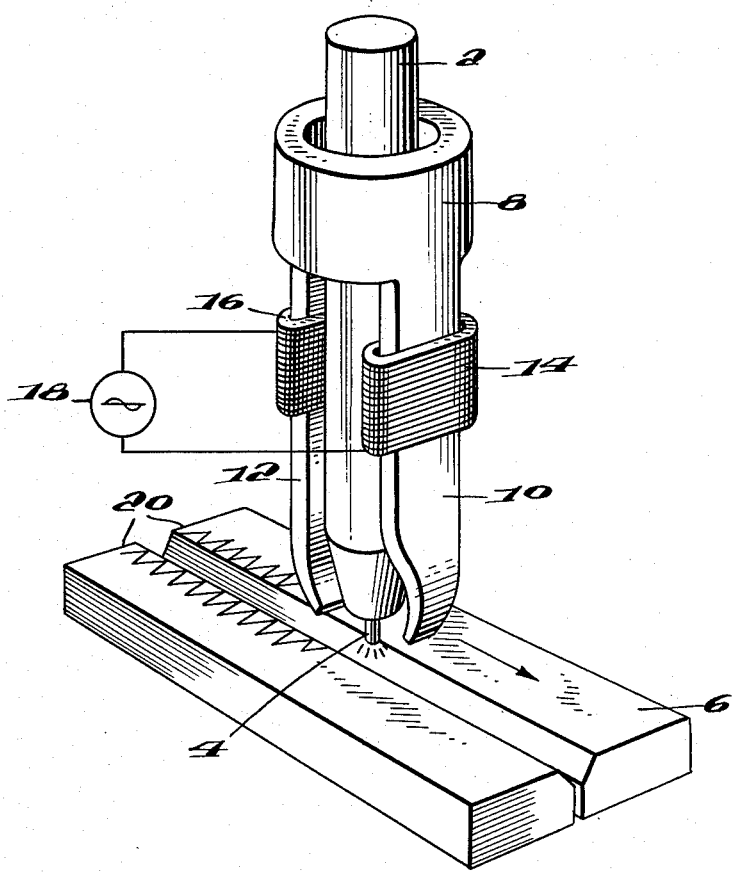
INVENTOR.
PIERRE REGNAULD,
BY
*Stevens Davis Miller + Mosher*
ATTORNEYS

United States Patent Office 3,130,294
Patented Apr. 21, 1964

3,130,294
METHOD FOR PRE-HEATING A JOINT
TO BE ARC-WELDED
Pierre Regnauld, Le Vesinet, France, assignor to L'Air
Liquide, Societe Anonyme pour l'Etude et l'Exploitation des Procedes Georges Claude
Filed Nov. 25, 1960, Ser. No. 71,521
Claims priority, application France Nov. 30, 1959
9 Claims. (Cl. 219—123)

This invention relates to a method and device for preheating metal parts which are to be arc-welded and one of its objects is to increase the speed of the arc-welding operation.

It is well-known that the speed of welding by means of a single arc is limited within a comparatively narrow range because, as soon as the welding speed rises beyond a predetermined value, the weld becomes defective. Undercut occurs along the welded bead or else the molten metal is distributed in an irregular manner and accumulates at some points which are separated from each other by hollow parts. Such phenomena are ascribable to a common cause, to wit the excessive cooling rate of the molten weld metal. Undercut occurs during the welding under a protecting atmosphere of an inert gas as a consequence of the insufficient penetration of heat along the edges of the weld, which leads to a more rapid cooling of the metal along said edges. The molten metal which has a tendency to fill the crater formed by the arc solidifies too soon along the edges and cannot thereby fill up the corrugations produced.

This limitation of the speed of welding is particularly critical when the welding is performed with a fusible electrode inside a protecting atmosphere. Thus, in the case of a butt-weld between two ordinary steel sheets having a thickness of 8 millimeters and which are bevelled down to mid-thickness, it is found, when operating under conditions corresponding to conventional practice, in particular as concerns the intensity which is adjusted to a value of 320 amperes, that corrugations appear as soon as the arc travel speed rises above 40 centimeters per minute.

In order to increase the speed of welding, it has already been proposed to use in front of the welding arc a preheating flame or auxiliary arc. The first method meets considerable difficulties in practice, which difficulties are ascribable in particular to the fact that the luminosity of the arc adjacent the flame is so high that the flame can hardly be seen through the protecting glasses which are necessarily worn by the operator. Furthermore, since the pe-heating is efficient only if the flame is sufficiently near the arc, the proximity of the latter is detrimental to the stability of the flame and leads even in too many circumstances to the extinction of the latter, which extinction may not be perceived by the operator by reason of this lack of visibility and results in the risk of an explosive reignition.

The use of one or more auxiliary arcs ahead of the main arc is more reliable, but it has not allowed hitherto an increase of speed sufficient for satisfying the present day requirements of industry.

Experiments have shown that, in the case of the welding operation considered hereinabove, with a metal thickness of 8 millimeters, the maximum possible speed is about 80 centimeters per minute for obtaining a weld free of undercut. The main difficulties met reside in the fact that the auxiliary arc has a tendency to settle, generally in a somewhat erratic manner, upon one of the edges of the joint which is thus overheated while the other edges is insufficiently heated. This leads to a non-uniform weld which is hardly satisfactory. The behavior of the auxiliary arc becomes particularly erratic when said auxiliary arc is placed near the main arc, for instance at a distance which is less than 10 centimeters, in an attempt to increase the pre-heating efficiency. The vicinity of the arcs results in a blowing effect, exerted by the main arc on the auxiliary arc. This effect becomes added to the other causes of instability acting on the auxiliary arc. These effects are troublesome enough when the main arc is protected by a layer of a mineral flux, but they are even more objectionable when the main arc is protected only by an inert atmosphere. Now, whereas the presence of a sufficient amount of mineral flux may uniformize to a certain extent the temperatures of the joint edges, it will be readily understood that welding in a gaseous atmosphere does not possess such a thermal regulating effect.

Furthermore, when welding underneath a layer of a mineral flux, it is possible, and it is even sometimes of advantage to allow the edges of the joint to melt to some extent during the preliminary heating, even if the joint does not melt in a truly uniform manner, as is generally the case. In contradistinction, when welding inside a gaseous atmosphere, no lack of uniformity on the preliminary melting is allowable. In particular, when an auxiliary arc of a very short length is produced in order to obtain a better arc stability and to provide for a better localization of the pre-heating, it is found that the melting is irregular and leads to the production of rows of drops which form solid projections along the joint. The main arc, when reaching said irregularly melted area, produces irregular corrugations. It is found furthermore that there occurs in the metal sheet which has begun to melt under the action of the auxiliary arc, a release of occluded gases and when the main arc reaches the area from which gases evolve, the effervescence increases and the volume of gases released is much larger than in the case of an arc reaching a metal sheet which has not been melted by the pre-heating. This gas volume is in fact larger than the amount which can be neutralized by the deoxidising products contained in the electrode wire, and it is found, that the weld shows an exaggerated porosity which is therefore ascribable to the fusion resulting of pre-heating. Generally speaking, a very small disturbance can make the preliminary heating irregular to an unallowable extent. The presence of an electric cable extending in the vicinity of the joint or even of a simple strap or clamp or again a slight draft of air can disturb the pre-heating arc.

The pre-heating method according to the present invention, has more particularly for its objects to allow placing the auxiliary pre-heating arc nearer the main arc so as to obtain a better efficiency of said auxiliary arc by shortening the time interval between the passages of the two arcs in succession over a predetermined point of the welding line, which reduces consequently, the heat losses which depend on the duration of said interval. The invention has also and chiefly for its object an improvement in the uniformity of the distribution of the flux of heat provided by the pre-heating arc in such manner that each edge of the joint may be heated over a substantially constant breadth to a temperature which is, as far as possible, slightly lower than the temperature of melting of the metal. The invention has also for its object an improvement in the shape of the area of penetration of the heat.

To this end, an improved method for the preliminary heating of the parts to be welded consists in preheating the joint to be welded in the arc by means of an auxiliary arc struck from a non-fusible electrode and its novelty resides in the fact that the auxiliary arc is stabilized by magnetic deflection as defined hereinafter, and/or by axial magnetic concentration, or by the blowing of a jet of inert gas, said stabilizing means being applied separately or in association in various manners as will be disclosed hereinafter.

During the investigations which have led to the present invention, I have found that magnetic deflection or sweeping which I had tried in order to spread the pre-heating arc and preventing it from striking permanently on one of the edges of the joint, led furthermore and in an unexpected manner to an advantageous stabilization of the auxiliary arc by protecting it to a considerable extent against disturbing causes disclosed hereinabove and more particularly against the blowing effect exerted by the main arc and by the flow of current in the cables and parts to be welded. Finally, this magnetic sweeping allowed placing the two arcs very near each other and this resulted in turn in a reduction of the heat losses and in an increase of the pre-heating efficiency. It is thus practically possible to reduce to 5 centimeters, and even less, the spacing between the arcs and to increase the welding speed for instance up to 1.20 meters per minute with the operative conditions specified hereinabove with 8 millimeters steel sheets. The welding speed may even be increased nearly up to 1.50 meters per minute with a current of about 360 amperes both for the preheating arc and for the main welding arc, the spacing between the two arcs in this latter case being about 7 centimeters.

According to my invention, the magnetic sweeping may be obtained by means of an alternating magnetic field at a very low frequency, say 3 to 20 cycles per second, and preferably 3 to 10 cycles per second, which magnetic field is directed transversely of the direction of travel of the electrode.

I have illustrated diagrammatically in the single figure of the accompanying drawing a simple arrangement providing for the magnetic sweeping of the arc in accordance with my invention.

The arrangement illustrated includes, generally speaking, a magnetic circuit in the shape of a horse-shoe armature the ends of which are arranged to either side of the arcing end of the auxiliary electrode, and the arms of which are surrounded by windings fed with A.C. at a very low frequency and under a reduced power, of about 40 watts for instance.

The amplitude of the magnetic sweeping may reach under such conditions a value of about 20 millimeters for instance, and it is found that very low energizing power so sufficient for stabilizing the arc.

In the arrangement illustrated by way of example in the drawing, a welding torch 2 is provided with a refractory electrode 4 forming preferably the positive pole or anode of the pre-heating arc, the cathode being the workpiece 6 to be welded.

The magnetic armature associated with the pre-heating electrode, comprises for instance, an annular yoke 8 surrounding the body of the torch and two longitudinal depending arms 10 and 12 terminating in the vicinity of the arcing tip of the refractory electrode 4. Over the arms 10 and 12 are arranged respectively two energizing windings 14 and 16 which are connected with a supply 18 of alternating current at a very low frequency, the intensity of this current being for instance of about 2 amperes under about 20 volts. When the torch moves over the metal sheet 6 in the direction of the arrow, the alternating magnetic field produces a transverse rocking of the arc and the area heated by the arc spreads uniformly to either side of the path of the electrode as illustrated diagrammatically by the two hatched areas 20 of the drawing.

Although in numerous cases, the transverse magnetic shifting is sufficient for producing the desired advantages, it is however of advantage to give the sweeping movement a longitudinal component which constrains the arc to follow a more or less elongated cycloidal path. It is also possible to adjust the frequency and the amplitude of sweeping, and also the wave-form of the energizing current with a view to distributing the pre-heating effect in any desired manner. In particular, the energizing current for the sweeping electromagnet may assume the shape of a square wave as obtained through a periodical reversal of a direct current by mechanical or electronic switching means or again it may assume a more or less accurately sinusoidal shape as obtained by means of a rotary potentiometer or of an inductive circuit provided with a rotating magnetic core. In practice, it is of advantage to adjust the sweeping frequency in a manner such that the successive points of impact of the arc may be sufficiently near one another so as to ensure a homogeneous distribution of the heat, taking into account the considerable increase of the translational speed allowed by my improved method. By way of example and in the case of metal sheets having a thickness of 8 millimeters, a spacing of about 5 millimeters, between the successive points of impact of the pre-heating arc is generally satisfactory.

The stabilizing effect of the alternating field producing the magnetic sweeping may be assisted, if required, or it may be replaced entirely or partly by the effect produced by an axial magnetic field which has for its result a concentration of the arc and which may be produced for instance by a winding arranged around the torch and which may be fed with the same direct current as the arc of the torch. One of the effects of the presence of an axial magnetic field consists in an increase of the rigidity of the arc, and a reduction of its sensitivity to other disturbing fields.

Taking into account, on the other hand, the fact that the pre-heating arc, according to my improved method, is preferably struck from a non-fusible anode protected by a current of an inert gas such as argon, I have also found it of advantage, according to my invention, to use the stream of inert gas for improving the pre-heating arc stability and consequently its efficiency. Thus, it is of advantage, in accordance with a preferred embodiment of my invention, to form the protective atmosphere for the pre-heating arc or arcs by a mixture of argon and hydrogen; for a given intensity of current, hydrogen allows an increase in the pre-heating energy and this is of particular advantage when the preheating arc is connected in series with the main welding arc. In contradistinction with what might have been feared, this addition of hydrogen has no detrimental effects on the compactness of the welding bead and, in fact, it seems even to improve said compactness. Such a result may be ascribed to the reducing effect of the hydrogen in the pre-heating arc. With 20% of hydrogen in the gas for the pre-heating arc and 5% of oxygen in the argon of the atmosphere surrounding the main arc, I have obtained welded joints of an excellent compactness which are practically devoid of any porosity due to the presence of hydrogen. When the pre-heating temperature is limited to a value lower than that of the incipient fusion of the metal, it seems that the absorption of hydrogen is practically negligible.

According to my invention, the stream of protecting gas surrounding the pre-heating arc may advantageously cooperate in the stabilization of said arc, by increasing its rigidity and reducing its spreading, chiefly when the arc length is relatively large. For this purpose, it is necessary to increase the speed of the flow of gas at the output of the nozzle around the auxiliary arc by reducing the cross-sectional area for the gases passing out of said nozzle. By way of example, said cross-sectional area for the gases may be slightly smaller than the cross-section of the electrode and the speed of the gases at the output end of said nozzle may be above 10 meters per second and preferably about 20 meters per second. In particular, I have obtained excellent results with a nozzle of an inner diameter of 5 mm., surrounding a tungsten electrode of 4 mm., the breadth of the annular cross-sectional passage for the gases being thus 0.5 mm. with a gas flow of 12 litres per minute. The blown arc is not only more concentrated under such conditions and more rigid, but it is also less sensitive to the parasitic magnetic fields produced in particular by the cables carrying the welding current and in the workpieces to be welded. In certain cases, it is possible to use the blown arc without any sweeping, in particular when the parts to be welded are bevelled and when it is desired to heat the inner edges of the bevels to a more considerable extent than the upper edges of the joint.

The pre-heating arc may also be struck between electrodes which are electrically independent of the parts to be welded; in particular, I may resort to a blown arc of the confined type wherein the arc is struck inside a chamber provided with one or more output ports of a reduced cross-section giving the jet of hot gases, a speed above 10 meters per second.

All the arrangements disclosed hereinabove are applicable to the case where several arcs are used for the preliminary heating and, in particular, where such arcs are arranged in tandem succession that is, one behind the other, along the axis of the joint.

They are applicable more particularly for welding with a fusible electrode inside a protecting atmosphere, but they are also of advantage for welding under a mineral flux and also for welding with a pulverulent flux adhering to the electrode through a magnetic effect. By reason of their flexibility, these arrangements are readily applicable to the most varied welding conditions, according to the extent of pre-heating required, taking into account the desired depth of penetration over a more or less broad area to either side of the joint.

It will often be found convenient to connect the auxiliary arc in series with the main arc, since they may operate with the same current intensity. Most of the usual generators produce as a matter of fact a no-load voltage which is sufficient for feeding the two arcs in series, which allows a simplification of the equipment by having a single generator. This is facilitated by the above-described magnetic sweeping by means of a field which is substantially more intense than any outer field liable to deflect the auxiliary arc.

When a plurality of pre-heating arcs are used, it may be of advantage to choose different sweeing characteristics for them according to the operative conditions required. For instance, in the case of a welding over a bevelled edge, one of the pre-heating arcs may be given only a small sweeping amplitude so as to heat more particularly the inside of the bevel, while a second preheating arc will be given a larger sweeping amplitude so as to heat the upper edges of the parts to be welded.

What I claim is:

1. A method for pre-heating a metal joint which is to be arc-welded, which comprises subjecting the edges of said joint to at least one inert-gas shielded auxiliary arc of the non-consumable electrode type, placing said auxiliary arc less than 10 centimeters ahead of the main welding arc and stabilizing said auxiliary arc to an extent sufficient for permitting substantially uniform and controllable heat input from said auxiliary arc to definite areas of both edges of said joint.

2. A method for pre-heating a metal joint which is to be welded by means of an inert-gas shielded welding arc with a fusible electrode, which comprises subjecting the edges of said joint to at least one inert-gas shielded auxiliary arc of the non-consumable electrode type, located less than 10 centimeters ahead of said welding arc, and stabilizing said auxiliary arc to an extent sufficient for allowing uniform pre-heating of both joint edges by said arc to a temperature just short of incipient fusion.

3. A method for pre-heating a metal joint which is to be welded by a welding arc with a fusible electrode, which comprises subjecting said joint to an inert-gas shielded auxiliary arc of the non-consumable electrode type, while oscillating said auxiliary arc transversely over said joint at a rate between 3 and 20 cycles per second correlated with the welding speed so as to pre-heat both edges of said joint uniformly.

4. A method for pre-heating a metal joint which is to be arc-welded, which comprises subjecting said joint to an inert-gas shielded auxiliary arc of the non-consumable electrode type and periodically deflecting said auxiliary arc transversely of the joint axis by the action of an alternating magnetic field parallel to the joint axis, while separately controlling the frequency of alternation, the intensity and wave form of said field for uniform pre-heating.

5. A method for pre-heating a metal joint which is to be welded by an inert-gas shielded welding arc with a fusible electrode, which comprises subjecting the edges of said joint to an inert-gas shielded auxiliary arc of the non-consumable electrode type, connecting said auxiliary arc in series with said welding arc and with a direct current welding source, and stabilizing said auxiliary arc against erratic deflection by stray magnetic fields from the welding arc.

6. A method for pre-heating a ferrous metal joint which is to be welded by an inert-gas shielded welding arc with a fusible electrode, which comprises subjecting alternatively and in quick succession both edges of said joint to an auxiliary arc of the non-consumable electrode type, shielding said auxiliary arc with a mixture of argon and hydrogen containing from 5 to 30 percent hydrogen, and controlling heat input from said auxiliary arc to said joint edges so that their fusion first occurs by the welding arc.

7. A method for pre-heating a ferrous metal joint according to claim 6, which comprises shielding the welding arc with a mixture of argon and oxygen containing approximately 5 percent oxygen.

8. In a high-speed arc welding process which comprises displacing an inert-gas shielded welding arc with a fusible electrode along the edges of a metal joint to be welded, together with at least one inert-gas shielded auxiliary arc of the non consumable electrode type, located ahead of said welding arc and adapted to pre-heat said joint edges, steps for stabilizing said pre-heating arc longitudinally and transversally for permitting reducing the distance between said pre-heating arc and the welding arc and allowing uniform and controllable pre-heating of said joint edges to a temperature just short of incipient fusion, said steps comprising at least one of the following:

(a) subjecting said auxiliary arc to an alternating and controllable magnetic field, capable of periodically deflecting said auxiliary arc transversally of the joint axis;

(b) imparting a velocity of at least 10 meters per second to the stream of shielding gas of said auxiliary arc.

9. In a high-speed arc welding process which comprises displacing an inert-gas shielded welding arc with a fusible electrode along the edges of a metal joint to be welded, together with at least one inert-gas shielded auxiliary arc of the non consumable electrode type, located ahead of said welding arc and adapted to pre-heat said joint edges, steps for stabilizing said pre-heating arc longitudinally and transversally for permitting reducing the distance between said pre-heating arc and the welding arc and allowing uniform and controllable pre-heating of said joint edges to a temperature just short of incipient fusion, said steps comprising subjecting simultaneously said auxiliary arc to an alternating and controllable magnetic field, capable of periodically deflecting said auxiliary arc transversally of the joint axis and to a non-alternating magnetic field, coaxial with the auxiliary arc and capable of concentrating said auxiliary arc.

UNITED STATES PATENTS
References Cited in the file of this patent

| | | |
|---|---|---|
| 2,743,342 | Bettis et al. | Apr. 24, 1956 |
| 2,756,311 | Persson et al. | July 24, 1956 |
| 2,806,124 | Gage | Sept. 10, 1957 |
| 2,858,411 | Gage | Oct. 28, 1958 |
| 2,905,805 | McElrath et al. | Sept. 22, 1959 |
| 2,907,864 | Rothschild et al. | Oct. 6, 1959 |